United States Patent [19]
Mann

[11] Patent Number: 5,791,117
[45] Date of Patent: Aug. 11, 1998

[54] PROCESS OF MAKING SLATTED PANELS FOR FURNITURE

[76] Inventor: Robert W. Mann, HCR 3, Box 953, Tucson, Ariz. 85739

[21] Appl. No.: 689,028

[22] Filed: Jul. 30, 1996

[51] Int. Cl.$^6$ .............................. B27D 1/00; B32B 31/10
[52] U.S. Cl. ................... 52/746.1; 52/311.2; 52/457; 52/745.15; 52/796.11; 144/351; 156/299
[58] Field of Search .................. 29/897.32; 52/311.1, 52/311.2, 313, 314, 745.15, 745.16, 745.19, 746.1, 747.1, 747.12, 782.2, 782.22, 783.1, 784.1, 796.1, 796.11, 455, 456, 457; 144/344, 345, 346, 350, 351; 156/63, 264, 265, 297, 299

[56] References Cited

U.S. PATENT DOCUMENTS

| | | | |
|---|---|---|---|
| 220,893 | 10/1879 | Westcott | 156/265 X |
| 1,655,699 | 1/1928 | Houston | 52/746.1 X |
| 2,751,946 | 6/1956 | Gramelspacher | 52/746.1 X |
| 2,828,533 | 4/1958 | Fromson | 52/783.1 X |
| 3,730,797 | 5/1973 | Jensen | 156/299 X |
| 3,899,860 | 8/1975 | Newell | 52/784.1 X |
| 4,293,362 | 10/1981 | Drobina | 156/265 X |
| 4,388,133 | 6/1983 | Hirao et al. | 156/264 X |
| 4,731,140 | 3/1988 | Yontrarak | 156/299 X |
| 4,900,378 | 2/1990 | Wistehuff | 156/265 X |
| 4,963,407 | 10/1990 | Detweiler et al. | 156/63 X |
| 4,999,066 | 3/1991 | Sherif | 156/299 X |
| 5,143,792 | 9/1992 | Cramer et al. | 144/350 X |
| 5,452,553 | 9/1995 | Clapp et al. | 52/460 X |

*Primary Examiner*—Carl D. Friedman
*Assistant Examiner*—Kevin D. Wilkens
*Attorney, Agent, or Firm*—Antonio R. Durando

[57] ABSTRACT

A method for making substrate-supported slatted panels which consists of first cutting each slat to the appropriate size required to form the panel. The slats are placed face down on a flat support and are assembled according to the design of the intended panel using a frame to keep the slats together, if necessary. Multiple uniform layers of contact adhesive are then progressively applied to the back of the slat panel so formed, thereby producing a flexible continuous sheet of adhesive backing the panel. At least one uniform layer of adhesive is also applied to a rigid substrate of dimensions appropriate to support the panel. When the adhesive is dry and ready for contact, the substrate is lifted and placed over the intended location on the slat panel using a series of spacers to prevent contact. Finally, the spacers are sequentially removed permitting contact and the formation of a rigid slatted panel.

10 Claims, 2 Drawing Sheets

PROCESS OF MAKING SLATTED PANELS FOR FURNITURE

BACKGROUND OF THE INVENTION

1. Field of the Invention

This invention is related in general to methods of making furniture and products derived therefrom. In particular, the invention discloses a new efficient process for making slotted wooden doors in a way that prevents warping and cracking between slats.

2. Description of the Related Art

Furniture and cabinet doors are often embellished with slotted panels inserted in the door frame. These panels may be inset, raised or flat, depending on the appearance desired by the furniture designer. In either case, the assembly of the slats to form a panel is a separate process from the manufacture of the rest of the furniture item and is carried out differently by individual furniture makers. Although general techniques are shared and well known in the industry, each maker develops personal tricks of the trade that are generally kept confidential.

Inasmuch as all slatted panels consist of an assembly of individual slats according to some design configuration, the objective is the same for all makers but the method by which the assembly occurs affects the panel's durability, strength and, ultimately, its appearance. Therefore, the process of making slotted panels is very important toward its ultimate value, even though at first glance the initial results may seem indistinguishable. The slats must be cut to size according to a pattern and then fitted together to form the panel that is then used on the door or other portion of furniture or cabinetry. Unless otherwise designed, the fit must be such that no fissures are left between slats; the assembly of the slats must result into a panel of exacts outer dimensions to fit within the intended space on the furniture; and the panel must be perfectly flat or otherwise conform to a predetermined desired shape. Therefore, the process of first cutting each slat from lumber in the required dimension and then connecting all slats to form a panel is difficult and time consuming.

Typically, a pattern is laid out defining the exact dimensions of the panel and of each slat within it. Then the slats are cut individually and finished according to the desired method of construction and appearance. For example, matching tongues and grooves may be formed at the edges to strengthen the panel and avoid openings between slats; the pieces may be beveled to delineate each slat within the panel; and embellishments may be added on the surface of some panels for ornamental purposes. Finally, a rigid support substrate may be attached to the panel to provide strength and prevent warpage, especially in case of relatively large panels.

When the slats are supported by a substrate, the process of assembly is greatly complicated and can be very time consuming. Typically, furniture makers build up the panels by starting on one end and progressively laying and gluing each slat on the substrate in the way a puzzle is put together. The substrate is kept flat on a horizontal support and is prepared by applying a uniform layer of flowable adhesive. The slats are then placed on the substrate and floated to a perfect position to form the desired panel design. After the adhesive dries, the panel is formed and ready for installation on the intended piece of furniture.

The problem with this method of making a panel is that it requires the use of adhesives that remain fluid for sufficient time to allow the placement of all slats on the substrate and their subsequent fine adjustment to produce the intended result. As the various slats are placed on the substrate, the glue flows between them and forms accumulations that are very difficult to remove and clean without also affecting the wood. If smaller amounts of glue are used to prevent its flowing, good adhesion of the slats is jeopardized and delamination and/or warpage are likely to occur in the future. Finally, if a tacky, non-flowing type of adhesive is used, the process of assembling the slats becomes impractical because no adjustment is possible after each slat is laid on the substrate. Therefore, glues that remain fluid during use are preferred and normally used in the trade.

Therefore, there is a need for an improved method of assembling slats to form a slatted panel supported by a rigid substrate. This invention discloses a procedure that greatly simplifies the prior-art processes and is believed to fulfill that need.

BRIEF SUMMARY OF THE INVENTION

One primary objective of this invention is a process for making a substrate-supported slatted panel preventing the leakage of adhesive through the slats to the front of the panel.

Another goal of the invention is a process that results in strong adhesion to the rigid support substrate, thereby preventing warpage of the slats and panel.

Another object of the invention is a slatted panel that prevents the expansion and contraction of the slats by adhesion to a thermally stable support and by insulation of the slats from moisture penetration.

Still another goal is a process that is particularly effective for relatively large slatted panels.

Another objective is a process that is suitable for incorporation with conventional furniture making practices and equipment.

Finally, an objective of this invention is a process that is efficient, is fast in relation to prior-art procedures, and can be implemented in an economical and commercially viable manner utilizing materials and equipment that are either already available or can be developed at reasonable cost.

Therefore, according to these and other objectives, the present invention consists of first cutting each slat of an intended slatted panel to the appropriate size required to form the panel. The slats are placed face down on a flat support and are assembled according to the design of the intended panel using a frame to keep the slats together, if necessary. Multiple uniform layers of contact adhesive are then progressively applied to the back of the slat panel so formed, thereby producing a flexible continuous sheet of adhesive backing the panel. Multiple uniform layers of adhesive are also applied to a thermally-stable, rigid substrate of dimensions appropriate to support the panel. When the adhesive is dry and ready for contact, the substrate is lifted and placed over the intended location on the slat panel using a series of spacers to prevent contact. Finally, the spacers are sequentially removed permitting contact and the formation of a rigid slatted panel.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

The principal inventive aspect of this disclosure lies in the idea of binding the slats of the panel to each other to form a continuous sheet prior to fixation to a supporting substrate. As a result, a flexible sheet of slats is obtained that is then attached to the substrate using contact glue, thereby preventing excess glue from flowing through fissures between slats and ensuring strong adhesion to the supporting substrate. Contact glue is defined for the purposes of this disclosure as glue that requires application to and at least partial drying on two separate surfaces, which are then contacted to cause bonding; contact between a coated surface and an uncoated one does not result in adherence.

Figure 1:
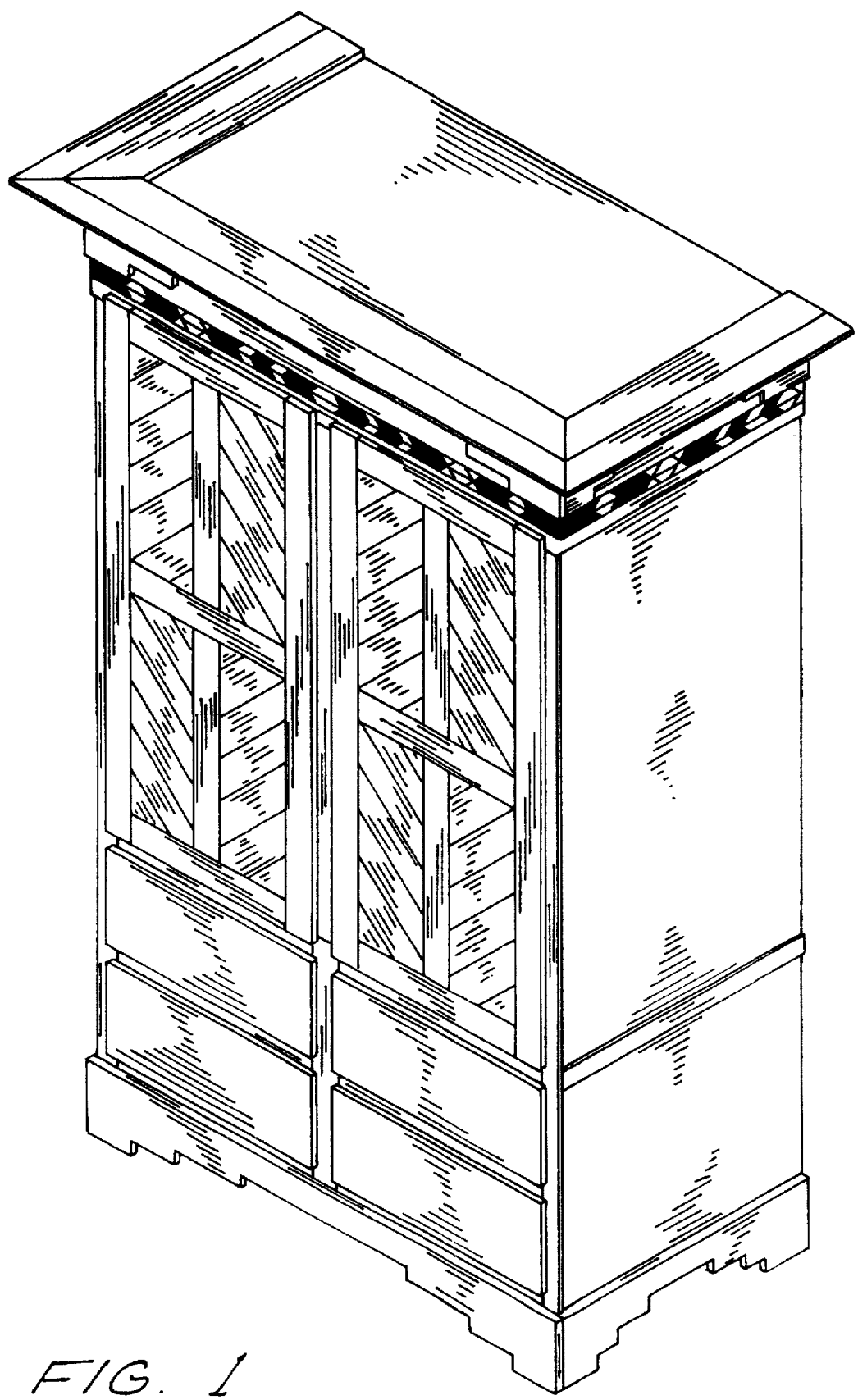
FIG. 1 is a perspective view of an illustrative armoire with slatted door of the type manufactured with the process of the invention.
Figure 2:
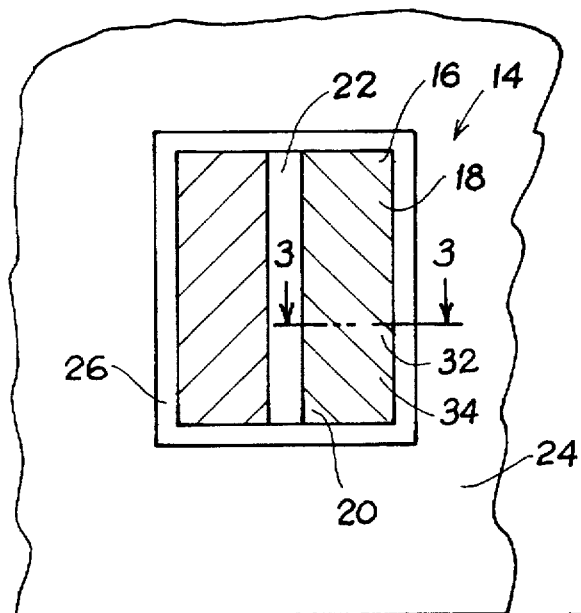
FIG. 2 is a plan view of the back side of the slats forming the slatted panels of the armoire in FIG. 1.

Referring to the drawings, wherein like parts are designated throughout with like numerals and symbols, FIG. 1 illustrates an armoire 10 having doors 12 that incorporate slatted panels 14 constructed according to the process of the present invention. These are relatively simple panels and the full advantage of the invention may not be readily apparent from their uncomplicated configuration, but they are used here for simplicity in illustrating the invention. In assembling each panel after the individual slats have been cut, sized and finished according to the design of the panel, the slats are laid on a support surface with their back facing up and their front facing down in contact with the surface, as illustrated in the plan view of FIG. 2. For purposes of clarity, the front of the slats is shown as shaded in the figures. Each component of the panel 14 is placed next to the other components in exactly the order and position required to form the panel, typically starting from a square corner (referred to in the trade as the "working corner"). Assuming that slat 16 is first laid down, slat 18 is then positioned next and so on until the first half of the panel is assembled with slat 20. The dividing slat 22 would then be placed and all other slats joined to it in similar fashion until the assembly is completed on top of the supporting surface 24. If necessary, an appropriately pre-sized frame 26, preferably adjustable to accommodate different-size panels, can be used to keep the pieces together after the assembly is completed.

Figure 3:
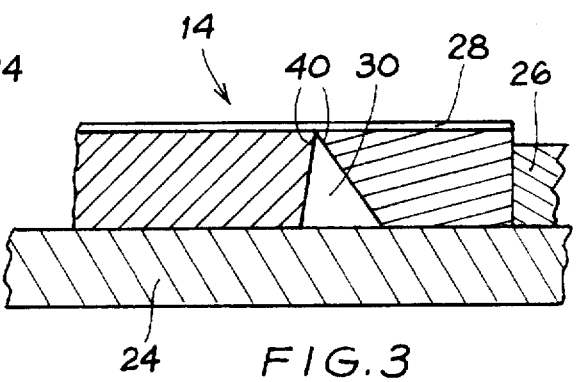
FIG. 3 is an enlarged partial cross-section taken from line 3—3 in FIG. 2.

The next step consists of applying preferably several continuous and uniform layers of glue to the back surface of the slat panel 14 (the surface seen in FIG. 2.) to form a unitary structure. A single layer may be sufficient depending on the properties of the glue used and the characteristics of the slats to be joined, but multiple layers are preferred (three or four being optimal). As would be obvious to those skilled in the art, each layer is applied after the prior layer has dried, until a continuous film of adhesive is obtained backing the slat panel. Application may be by spraying, brushing, rolling or any other method used to deposit a film of adhesive on a surface. The preferred glue is a contact type adhesive, which does not flow freely and dries rapidly, thereby avoiding seepage through the cracks between slats. Another important property of the adhesive is that it retain some resilience after drying, such that a flexible continuous sheet 28 of glue results from these multiple applications, as illustrated in the enlarged partial section of FIG. 3. Note that an opening 30 is shown in the figure corresponding to typical beveled edges between two adjacent slats (for example, slats 32 and 34). I found that the best results are obtained with latex glues for plastic laminates, such as the product sold the 3M Company of St. Paul, Minn., under the trademark 1630-NF NEUTRAL. Organic-solvent based glues are functionally acceptable but environmentally undesirable and, therefore, not recommended. Flowable glues tend to require clamps and presses and take too long to dry for efficient operation; hot-melt glues set too fast and tend to trap air over the surface of the slats which causes warpage, thus being impractical for use in this application.

Figure 4:
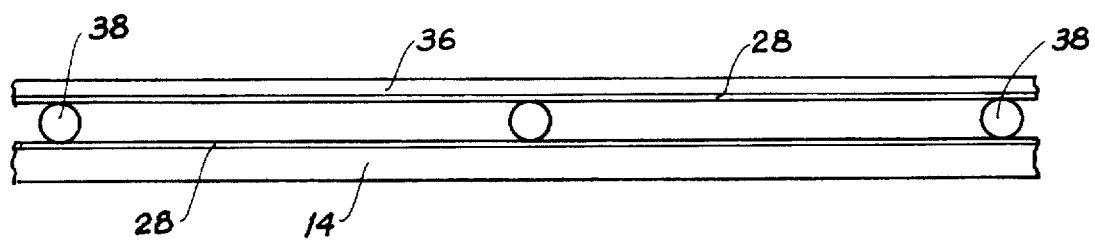
FIG. 4 is a partial end view of the coated slat panel of the invention after placement, through appropriate separating spacers, over the matching adhesive surface of a rigid support substrate.
Figure 5:
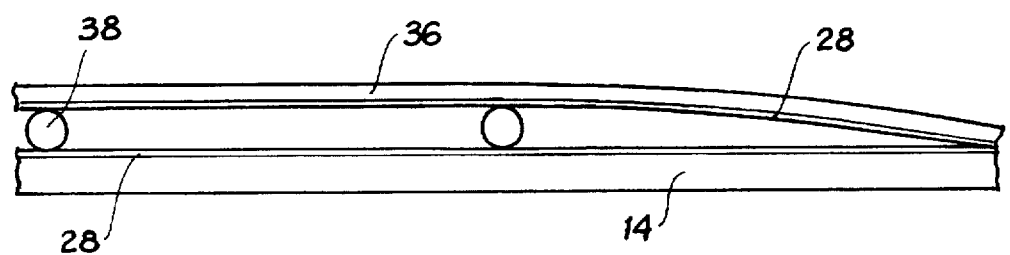
FIG. 5 is another view of the arrangement of FIG. 4 showing the progressive contact and attachment of the back side of the slat panel to the support substrate.

Substantially contemporaneously with the application of the layers of adhesive to the back of the slat panel 14, the adhesive 28 is also applied, preferably in multiple layers, to a rigid substrate 36 to which the panel is intended to be attached. When the glue is ready for adhesion by contact, the substrate 36 is lifted and placed over the panel 14, held together as a single piece by the binding backing provided by the flexible sheet 28 of glue, and multiple spacers 38 are used to separate the two adhesive surfaces, as illustrated in the end view of FIG. 4. Note that the coated surfaces will not adhere to the uncoated spacers 38. Starting at one end of the panel, the spacers 38 are progressively removed, preferably one by one, as shown in FIG. 5, and the adhesive surfaces of the panel and the substrate are allowed to contact and bind, thereby forming a strong, substrate-supported, rigid slatted panel. It is noted that the flexibility of the relatively thin substrate 36 allows it to bend and make contact with the panel 14 as each spacer 38 is removed (see FIG. 5). Note also that the flexibility of the film 28 allows the bending of the panel 14 along the abutting edges 40 of the slats, thereby making it possible to handle the panel with ease while maintaining its design configuration.

The material used for the substrate 36 needs to be thermally stable, with a relatively low thermal coefficient of expansion, or with one approximately equal to that of the material constituting the slatted panel, so that changes in temperature do not cause separation of the slats. The substrate and the binding adhesive must be capable of holding in place individual slats when they warp, which is unavoidable for solid woods with changes in moisture and temperature. In addition, in order to prevent deformations in the panel, the substrate itself should not warp under varying weather and aging conditions. I found that melamine-resin plastics are ideal for applications with wooden slats.

Thus, the slatted panels resulting from the process of the invention are very stable and durable, and are suitable for very large applications. No glue is caused to seep through the cracks between slats because the method does not require the application of any pressure to it and the glue's surface tension prevents it from flowing simply by gravity. The process can be applied to slatted panels of any shape and made with any material, and the particular shape and characteristics of each slat are not limiting in any way.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is not to be limited to the details disclosed herein but is to be accorded the full scope of the claims so as to embrace any and all equivalent methods and products.

I claim:

1. A method of making a slatted panel from a plurality of pre-cut individual slats having front surfaces and back surfaces, comprising the following steps:

assembling said plurality of pre-cut individual slats into a predetermined configuration to form a slatted panel having a first surface corresponding to the front surfaces of said slats and a second surface corresponding to the back surfaces of the slats;

applying at least one continuous coat of adhesive to said second surface of the panel to form a unitary structure; and bonding said second surface of the panel to a support substrate;

wherein said step of bonding said second surface of the panel to a support substrate is carried out by applying at least one coat of adhesive to the substrate; placing said coated substrate opposite to said second surface of the panel with spacers therebetween to prevent contact between the second surface and the substrate; and removing the spacers to allow contact and bonding between the second surface of the panel and the substrate.

2. The method recited in claim 1, wherein said step of applying at least one continuous coat of adhesive to said second surface of the panel is carried out to obtain a flexible continuous sheet of adhesive backing the panel.

3. The method recited in claim 2, wherein said adhesive consists of a latex glue.

4. The method recited in claim 3, wherein said support substrate consists of a melamine-resin plastic.

5. The method recited in claim 2, wherein said support substrate consists of a melamine-resin plastic.

6. The method recited in claim 2, wherein said step of assembling said plurality of pre-cut individual slats into a predetermined configuration to form a slatted panel is carried out with a frame to contain and hold in place the slatted panel so assembled.

7. The method recited in claim 1, wherein said adhesive consists of a latex glue.

8. The method recited in claim 7, wherein said support substrate consists of a melamine-resin plastic.

9. The method recited in claim 1, wherein said support substrate consists of a melamine-resin plastic.

10. The method recited in claim 1, wherein said step of assembling said plurality of pre-cut individual slats into a predetermined configuration to form a slatted panel is carried out with a frame to contain and hold in place the slatted panel so assembled.

\* \* \* \* \*